Figure 1A:
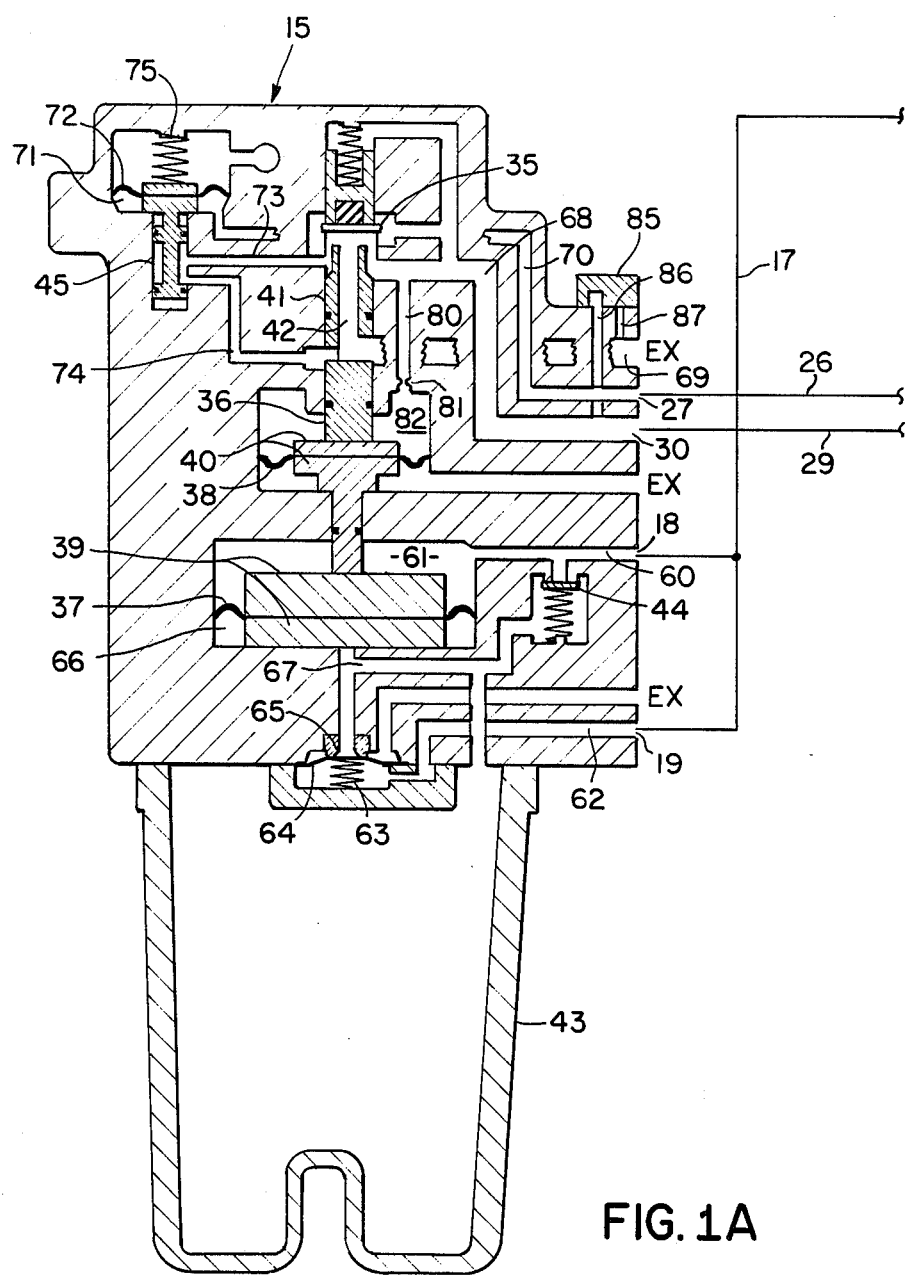

United States Patent [19]

Vaughn et al.

[11] Patent Number: 4,775,194
[45] Date of Patent: Oct. 4, 1988

[54] PNEUMATICALLY OPERATED GRADUATED RELEASE VALVE FOR RAIL VEHICLES

[75] Inventors: Lawrence Vaughn, Watertown; Ronald Newton, Adams; Thomas Engle, Clayton, all of N.Y.

[73] Assignee: General Signal Corporation, Stamford, Conn.

[21] Appl. No.: 144,735

[22] Filed: Jan. 15, 1988

Related U.S. Application Data

[63] Continuation of Ser. No. 871,635, Jun. 6, 1986, abandoned.

[51] Int. Cl.$^4$ ............................................. B60T 15/54
[52] U.S. Cl. ......................................................... 303/74
[58] Field of Search ....................... 303/33, 35, 36, 64, 303/69, 72, 73, 74

[56] References Cited

U.S. PATENT DOCUMENTS

| 3,232,678 | 2/1966 | Wilson | 303/80 |
| 3,994,536 | 11/1976 | Prada | 303/74 X |
| 4,033,632 | 7/1977 | Wilson | 303/74 |
| 4,067,624 | 1/1978 | McEathron | 303/69 |
| 4,558,907 | 12/1985 | Reiss et al. | 303/74 |

Primary Examiner—Duane A. Reger
Attorney, Agent, or Firm—Harold S. Wynn; Robert R. Hubbard

[57] ABSTRACT

Passenger rail vehicle brake control valve apparatus includes, a control valve device of the type limited to direct release of the brakes, having service, emergency, and continuous quick service portions secured to a pipe bracket, and a graduated release valve portion governed jointly by brake cylinder pressure, brake cylinder exhaust passage pressure from the control valve device, and brake pipe pressure to at times modify output of the control valve device to provide for graduated control of the passenger rail vehicle brakes.

26 Claims, 6 Drawing Sheets

PNEUMATICALLY OPERATED GRADUATED RELEASE VALVE FOR RAIL VEHICLES

This application is a continuation of application Ser. No. 871,635, filed on 6/6/86, now abandoned.

BACKGROUND OF THE INVENTION

Reference to Prior Cases

This invention relates to a prior McEathron U.S. Pat. No. 4,067,624, granted Jan. 10, 1978, which is assigned to the same assignee as the present invention and to prior patents of Hart U.S. Pat. No. 4,106,819, Hart U.S. Pat. No. 4,188,071, Wilson U.S. Pat. No. 4,033,632 and Wilson U.S. Pat. No. 3,175,276. These patents are incorporated herein by reference for a better understanding of the background of the present invention.

The present invention relates to pneumatically operated graduating release valve devices for railway vehicles, and it more particularly relates to improved graduating release valve devices for use on passenger rail vehicles.

Graduating release brake control devices currently being used on passenger rail vehicles are of the general type known as 26-C. Direct release brake control devices, however, have been improved for use on freight rail vehicles to provide improved responsiveness during brake application mode and freedom from sticking brakes on long trains during the release mode. Such a brake control device is generally known as an ABDW brake control device for freight vehicles, which is of the type generally disclosed in the Wilson U.S. Pat. No. 3,232,678, representing the well known ABD valve device, combined with a continuous quick service portion as disclosed in the Wilson U.S. Pat. No. 3,175,276.

An object of the present invention is to provide pneumatically operated graduating release valve devices for passenger rail vehicles which obviate limitations of the prior art graduating release valve devices.

Another object of the present invention is to provide improved pneumatically operated graduating release valve devices incorporating improved operating features of currently used direct release freight rail vehicle ABDW control valve devices.

Other objects, purposes, and characteristic features of the present invention will be in part obvious from the accompanying drawings, and in part pointed out as the description of the invention progresses.

SUMMARY OF THE INVENTION

A brake control system for a passenger rail vehicle brakes comprises, an ABDW control valve device, such as is used for the control of freight rail vehicles, having service, emergency, and continuous quick service portions, secured to a pipe bracket, the pipe bracket being connected to a brake pipe and to emergency and auxilary reservoir portions.

A graduating release valve portion is operably connected to the ABDW control valve device, and to the brake pipe, for providing graduating release of the passenger rail vehicle brakes. The graduating release valve portion comprises a graduating check, the graduating stack valve subject to actuation axially by a graduating stack having coaxially connected first and second diaphragms, the first diaphragm comparing brake pipe pressure and control reservoir pressure, and the second diaphragm comparing brake cylinder release passage pressure with a resultant force on the first diaphragm.

Application of the brakes of the passenger rail vehicle is governed by the ABDW control valve device and the release of the brakes of the passenger rail vehicle is governed jointly by the ABDW control valve device and the graduating release valve portion to provide improved responsiveness for braking the passenger vehicle during the brake application mode of operation and providing freedom from sticking brakes on long trains during the release mode of operation, resulting in freedom from slack action by use of the graduating release portion in combination with the ABDW device.

In describing the invention in detail, reference is made to the accompanying drawings.

IN THE DRAWINGS

Figure 1B:
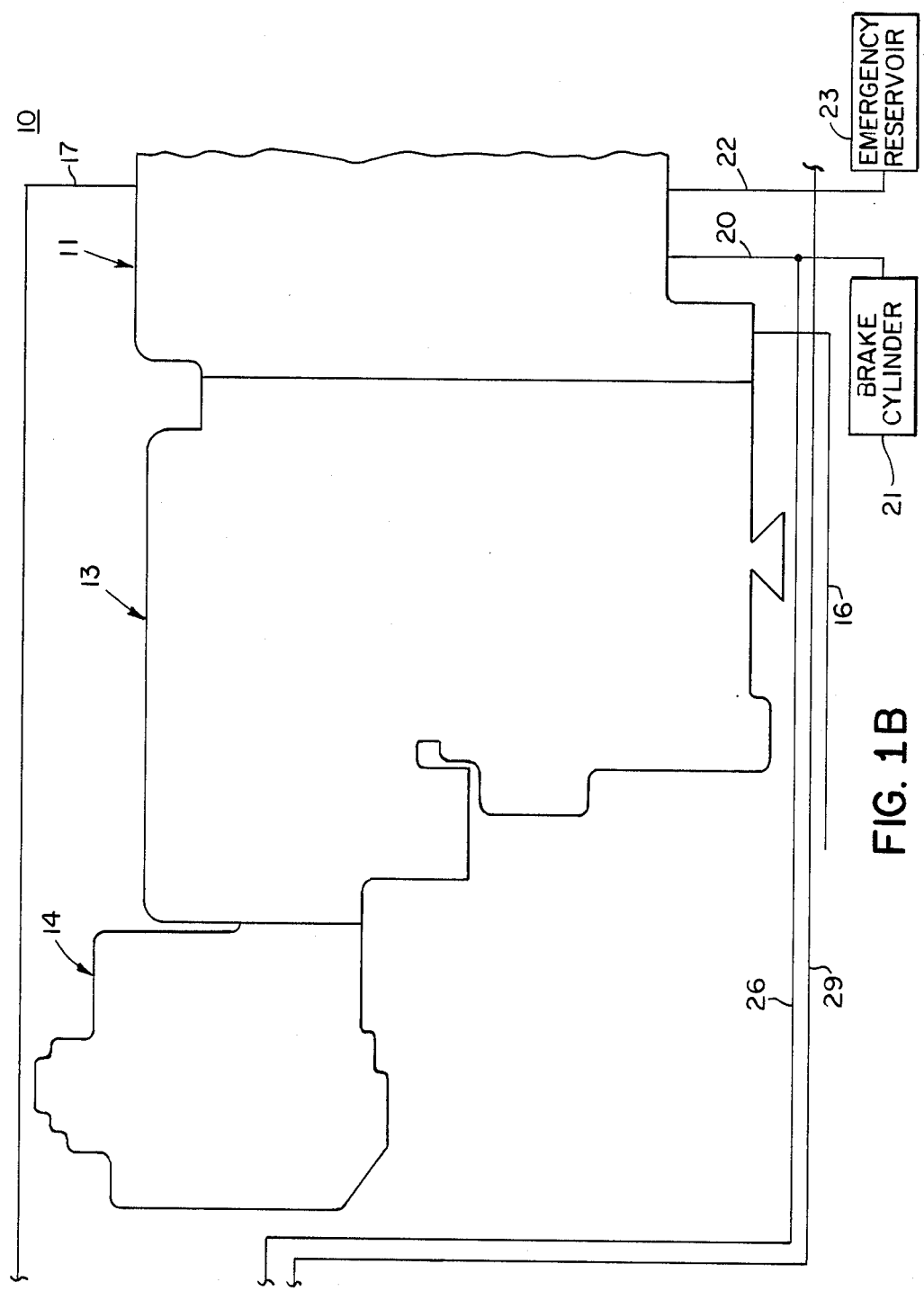
Figure 1C:
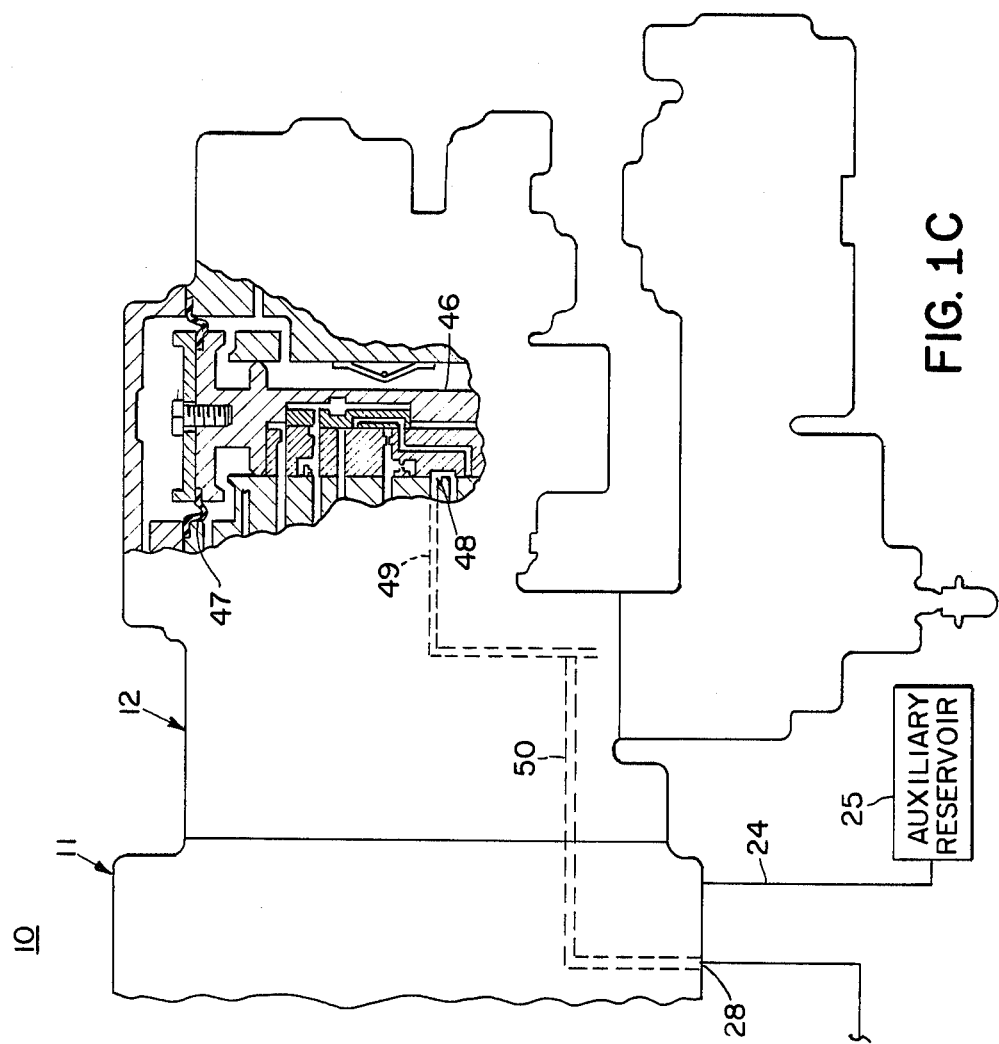
Figure 2:
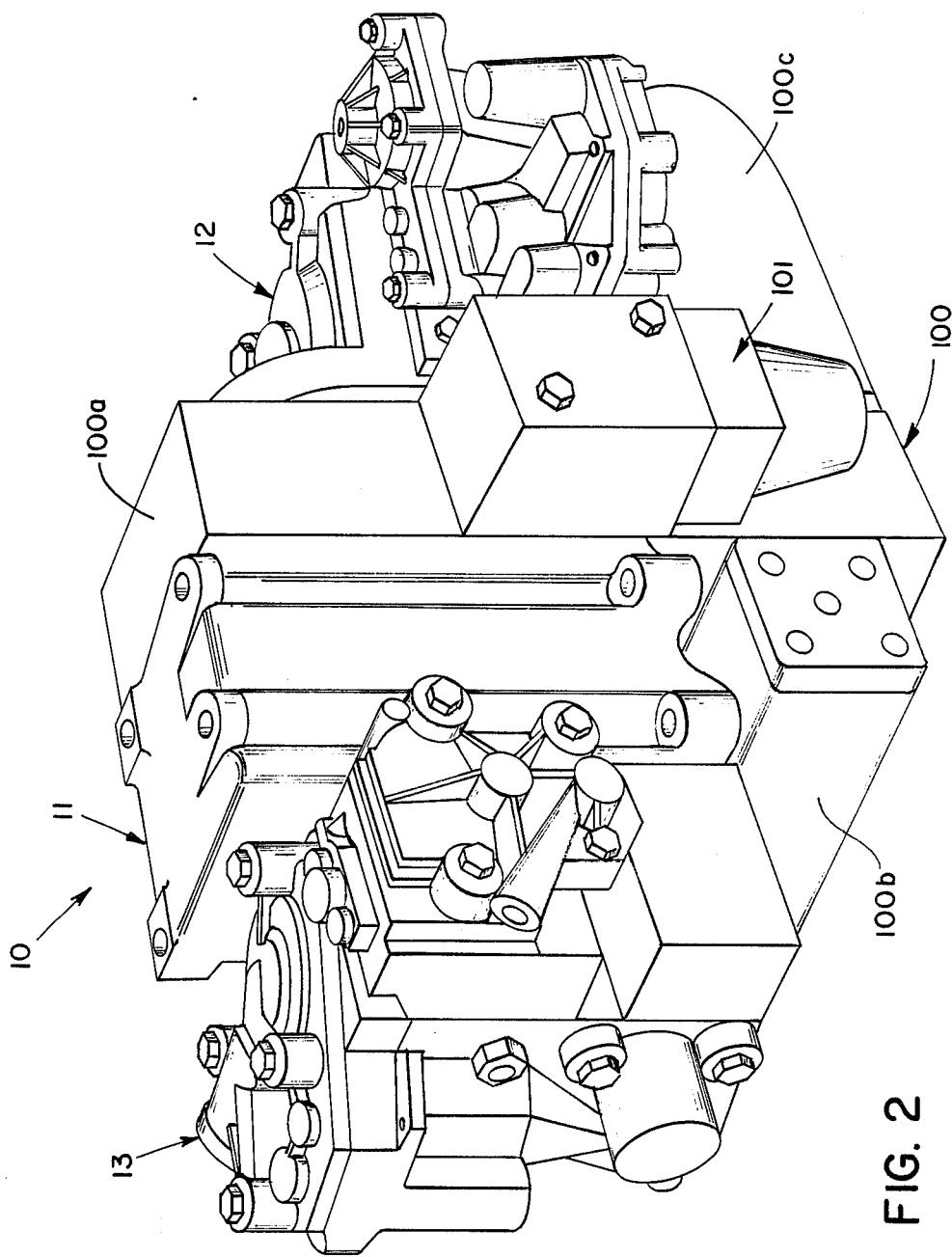
Figure 3:
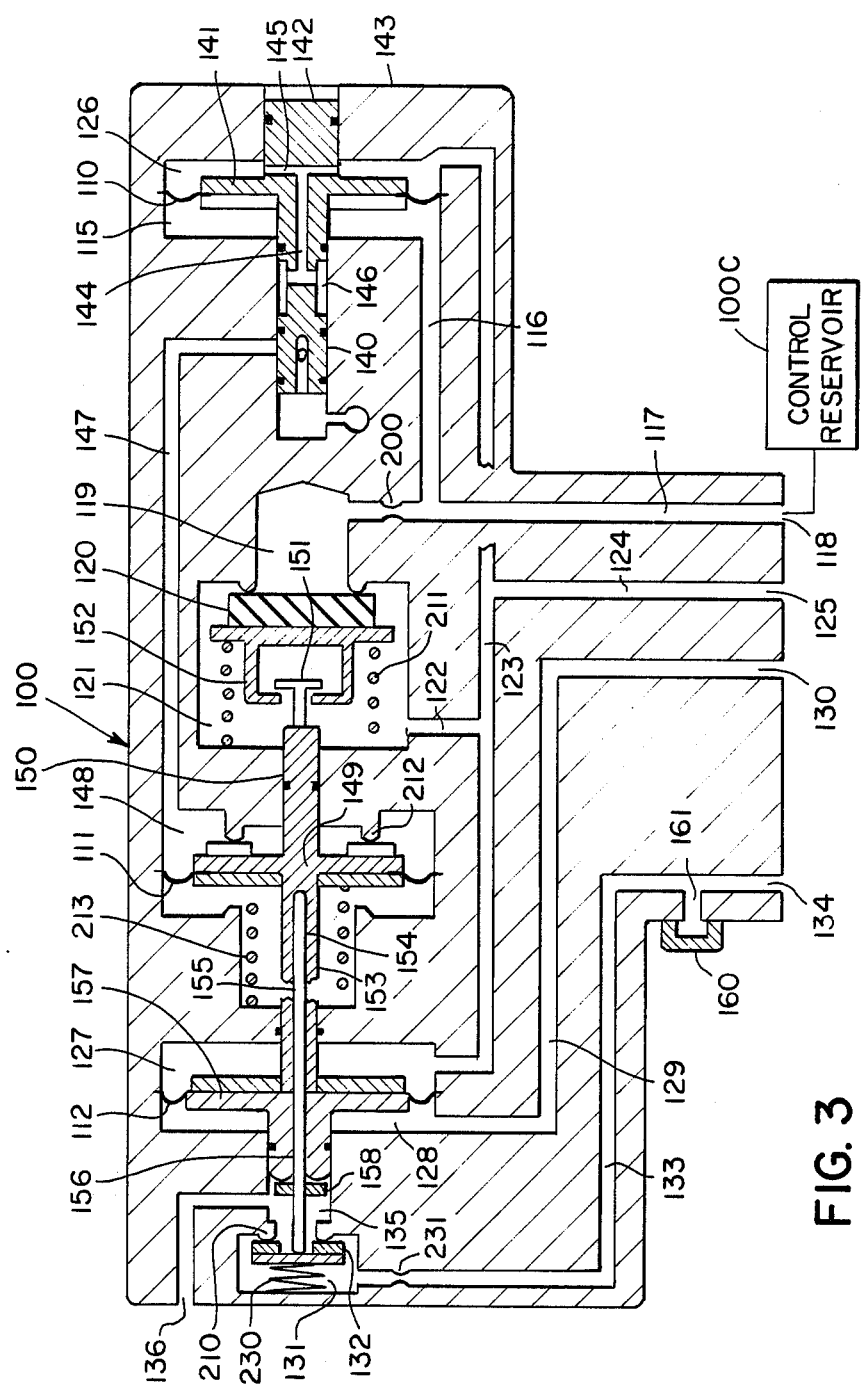
Figure 4:
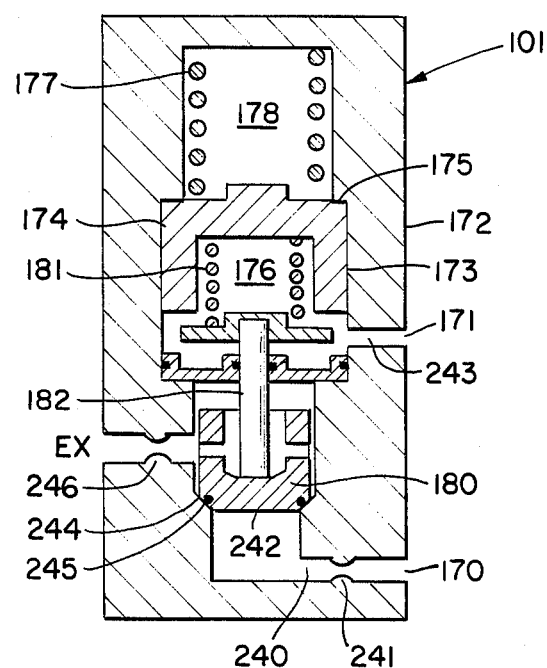

FIGS. 1A, 1B and 1C, when placed end-to-end, ilustrate partly by elevational cross section and partly diagramatically a preferred embodiment of a pneumatically operated combined ABDW and graduating release valve device according to the present invention, FIG. 2 is a view in perspective of a modified embodiment of the present invention illustrating a modified form of the present invention wherein a graduating valve device is integrated into the structure of a conventional ABDW valve device, FIG. 3 is an elevational schematic diagram, partly in cross section, of a modified graduating valve device according to FIG. 2, and FIG. 4 is an elevational schematic diagram, partly in cross section, of a two-pressure safety valve device used in the modified embodiment of FIG. 2.

With reference to FIGS. 1A, 1B and 1C of the drawings, a brake control system for passenger rail vehicle brakes is illustrated as comprising an ABDW control valve device 10 having a pipe bracket 11, to which is secured on the right hand side thereof a service portion 12, and on the left hand side thereof, an emergency portion 13. Secured to the left hand end of the emergency portion 13 is a continuous quick service portion 14. A graduating release valve portion 15 is operably connected to the ABDW control valve 10.

A conventional brake pipe 16 of a typical passenger vehicle is connected to the pipe bracket 11, pipe bracket 11 containing a conventional brake pipe air filter, the filtered brake pipe air being applied over line 17 to the graduating release portion 15 at ports 18 and 19. Pipe bracket 11 is also connected over line 20 to a typical brake cylinder 21 over a line 22, to an emergency reservoir 23, and over line 24 to an auxilary reservoir 25. Brake cylinder 21 is also connected over line 26 to port 27 of the graduating release portion 15, and the brake cylinder exhaust port 28 of the pipe bracket 11 is connected over line 29 to port 30 of the graduating release valve portion 15.

The graduating release valve portion comprises a graduating check valve 35, together with a graduating valve stack 36 for actuation of the graduating check valve 35, the stack 36 comprising first and second diaphragms 37 and 38 (commonly known as 100% and 40% diaphragms) respectively, together with supporting abutments 39 and 40. The graduating stack 36 has a coaxial graduating stem 41 for axially actuating the graduating check valve 35, the stem 41 having an axial passage 42 for the venting of brake cylinder fluid.

The graduating valve portion 15 also comprises a control reservoir 43, a control reservoir check valve 44 for charging the control reservoir 43 from the brake pipe fluid passage 17, and a release insuring valve 45 for insuring full release of fluid pressure in the brake cylinder 21.

With reference to FIG. 1C, the service portion 12 comprises a service slide valve 46, operable axially upon comparing brake pipe pressure with auxiliary reservoir pressure on opposite sides of a diaphragm 47. When brake pipe pressure is increased to signal the release of the brakes, brake pipe pressure above the diaphragm 47 actuates the slide valve 46 downwardly to a position as illustrated wherein the brake cylinder fluid is exhausted through passages 48 and 49 of the service portion, which applies fluid brake cylinder exhaust pressure through passage 48 of the service slide valve 46 and passages 49 and 50 to the port 28 in the pipe bracket 11. From here the brake cylinder exhaust fluid is applied over line 26 to the graduating release valve portion 15.

It is to be understood that the graduating valve portion 15 can be mounted separately on a pipe bracket, or can be integrated with the control valve device 10, to be disposed, for example, between the pipe bracket 10 and the service portion 12 as shown in FIG. 2.

Further consideration will now be given relative to the detail operation of the system under various operating conditions.

OPERATION OF FIGS. 1A, 1B, AND 1C

Initial Charging

With the control valve apparatus completely void of pneumatic pressure, charging the train line brake pipe 16 by means of a locomotive brake valve (not shown) causes the ABDW brake valve device to be conditioned as is well known and described in the prior patents, and the graduating release valve portion 15 is conditioned as follows.

Filtered brake pipe air passes from the pipe bracket 11 over passage 17 to port 18 and through passage 60 to chamber 61 above the diaphragm 37. At the same time, brake pipe fluid flows through port 19 over passage 62 to chamber 63 on the lower side of a control reservoir dissipation valve diaphragm 64, holding it against a check valve seat 65 is preparation for the charging of the control reservoir 43. When pressure on the face of the control reservoir charging check valve 44 exceeds a nominal pressure, such as 2.5 psi, the check valve 44 opens, allowing control reservoir charging. Chamber 66, beneath the diaphragm 37 is charged by fluid over passage 67 from the check valve 44.

When the brake pipe 16 is fully charged, pressure in the control reservoir 43 is equal to the brake pipe pressure, and the control reservoir charging check valve 44 is closed. The release insuring valve 45 and the graduating valve 35 are open under these conditions, with the brake cylinder exhaust line 29 connected to exhaust through port 30, passage 68, center passage 42 of the graduating release valve stem 41, and exhaust passage 69. A parallel path for brake cylinder exhaust also exists through port 30, passage 68, passage 73, through release insuring valve 45, and passage 74 to passage 69.

Service Brake Application

The graduating release valve portion 15 (see FIG. 1A) is conditioned during a service brake application to make available graduating release operation, if a minimum service brake application is exceeded. If only a minimum service brake application is made, the release insuring valve 45 remains open to permit direct release of brake cylinder pressure in response to movement of the service portion 12 of the control valve device 10 to a release position.

During a service brake application, the pressure in chamber 61 follows the brake pipe pressure as it is reduced to create a pressure differential across the diaphragm 37 upon comparing brake pipe pressure with control reservoir pressure on opposite sides of 100% diaphragm 37. The pressure differential that is created causes the graduating valve stack 36 to move upwardly, sealing the upper end of graduating valve stem 41 against the graduating check valve 35. This cuts off one path for exhaust of brake cylinder pressure in passage 67, but a by-pass passage for brake cylinder exhaust is maintained open through the release insuring valve 45 until pressure in the brake cylinder delivery pipe 26, which is applied through passage 70 to a chamber 71 below diaphragm 72 of the release insuring valve reaches a nominal pressure, such as 9 psi. At this time the valve 45 moves upwardly and cuts off the second brake cylinder exhaust path through passages 68, 73, and 74 to the exhaust passage 69. This pressure for operating the release insuring valve 45 is governed by a graduating spring 75.

Graduating Release

To initiate a graduating brake release, brake pipe pressure must first be increased approximately 3 psi so as to move the slide valve 46 (see FIG. 1C) downwardly to the position illustrated to open an exhaust passage 48 for the brake cylinder 21 to deliver brake cylinder exhaust fluid pressure over passages 49, 50, and 29 to port 30 (see FIG. 1A) of the graduating release valve portion 15. Brake cylinder exhaust pressure in passage 68 is applied over passage 80 through a choke 81 to a chamber 82 above the diaphragm 38.

The downward force created by the brake cylinder pressure in chamber 82 and the brake pipe pressure in chamber 61 are combined against the upward force created by control reservoir pressure in chamber 66. If the downward and upward forces are equal, the graduating valve stem 41 remains seated against the graduating valve check valve 35. Increasing the brake pipe pressure creates a force imbalance in the downward direction, which causes the graduating valve stack 36 to move downward, unseating the graduating valve stem 41 from the check valve 35. With the graduating valve stem 41 unseated, brake cylinder pressure is allowed to flow to exhaust via the graduating valve stem central passage 42 and passage 69 to the exhaust portion EX. When the brake cylinder release pipe pressure in chamber 82, above diaphragm 38, has been reduced sufficiently to create a slight upward force imbalance, the graduating valve 36 moves upwardly, sealing the stem 41 against the check valve 35, and terminating the flow of brake cylinder pressure to exhaust.

Thus, the graduating check valve 35 opens and closes intermittently in response to gradual increases in brake pipe pressure until the brake cylinder pressure has been reduced below 10 psi, at which time the release insuring valve spring 75 moves the release insuring valve downwardly and opens a path between passage 68 and exhaust passage 69 through passage 73, valve 45, passage 74, and passage 69 to the exhaust port EX. This insures that brake cylinder pressure is reduced to zero.

Direct Release

Should it be desirable to operate the graduating valve portion as a direct release valve, it is only necessary, with the brakes fully released, to remove a graduating release cap 85 (see FIG. 1A), rotate the cap 85 180°, and reinstall the cap 85 on the housing of graduating valve portion 15. This positioning of the graduating cap 85 permits bypassing of the operation of the graduating release valve 35 by connecting the brake cylinder exhaust passage 68 directly to the exhaust passage 69 through passages 86 and 87.

Control Reservoir Overcharge Dissipation

Should it be necessary to reduce the operating brake pipe 16 normal pressure, the pressure in the control reservoir 43 must also be reduced to the new brake pipe pressure so as to maintain the proper pressure balance on the graduating valve diaphragm stack 36. In order to dissipate the overcharge in the control reservoir 43 under these conditions, it is necessary to reduce brake pipe pressure to appoximately 30 psi, which causes a reduction of pressure in chamber 63, beneath diaphragm 64, which allows control reservoir pressure working on the upper side of the control reservoir dissipation valve diaphragm 64 to move diaphragm 64 off of the check valve seat 65, reducing the control reservoir pressure to the desired level.

Release From An Emergency Brake Application

During an emergency brake application, brake pipe pressure in chamber 63 (see FIG. 1A) on the lower side of diaphragm valve 64 is reduced to zero. This action allows control reservoir pressure to unseat the diaphragm check valve 64 which allows control reservoir pressure to be reduced to approximately 10 psi. This reduction of control reservoir pressure conditions the graduating valve 35 for direct release operation during the emergency brake release. Movement of the service slide valve 46 (see FIG. 1C) to release position during the emergency brake release connects brake cylinder exhaust passages to the graduating check valve 35 and chamber 82 via port 30 and connecting passage 68. With control reservoir at reduced pressure, a downward force imbalance is created, moving and holding the graduating valve stem 41 in its lowermost position, allowing brake cylinder pressure to reduce to zero.

With reference to FIGS. 2, 3, 4, 1B and 1C, a modified embodiment of the present invention is illustrated wherein a filling piece portion (not shown) is disposed between a pipe bracket 11 and a service portion 12 of a conventional ABDW valve device 10 that has been heretofore described. To this filling piece portion is mounted a graduating release valve portion 100 (see FIG. 3), packaged in separate sections 100a, 100b, and 100c (see FIG. 2), and a two pressure safety valve 101 (see FIGS. 2 and 3). It is to be understood that other packaging arrangements than that typically illustrated in FIG. 2 for the graduating valve portion 100 of FIG. 3 may be employed.

With reference to FIG. 3, the graduating valve portion 100 comprises first, second, and third diaphragms 110, 111, and 112 respectively. The diaphragm 110 has a pressure chamber 115 on the left hand side thereof that is connected over passages 116 and 117 to an input port 118 that is connected to the control reservoir 100c. The control reservoir 100c is also connected over passage 117 to a chamber 119 at the right of a control reservoir charging check valve 120. The left hand side of the check valve 120 has a chamber 121 that is connected over passages 122, 123, and 124 to an input port 125 that is connected to the brake pipe through a conventional brake pipe air filter in the pipe bracket 11 over passage 17 (see FIG. 1B). Brake pipe air pressure is also connected from input port 125 over passages 124 and 123 to a chamber 126 at the right hand side of the diaphragm 110. A chamber 127 on the right hand side of diaphragm 112 is also connected over passages 123 and 124 to sense brake pipe pressure. A chamber 128 on the left hand side of diaphragm 112 is connected over passage 129 to inlet port 130, which is connected over passage 22 (see FIG. 1B) to the emergency reservoir 23. A chamber 131 on the left hand side of a graduating check valve 132 is connected over passage 133 to an input port 134 that is in turn connected over a passage 29 (see FIGS. 1B and 1C) to port 28 of the ABDW valve for exhaust of the brake cylinder 21 during a graduated release of the brakes. At the right hand side of a graduating valve 132 is an exhaust chamber 135 that is connected to atmosphere over passage 136.

A slide valve 140 is integral with abutment 141 adjoining the diaphragm 110, which is also integral with a stem 142 of slightly larger diameter than the valve portion 140 and is journalled in the end portion 143 of a suitable casing. Slide valve 140 has an axial passage 144, a transverse passage 145, and a pheriphial passage 146 that is connected to the axial passage 144 for at times delivering brake pipe fluid over passage 147 to a chamber 148 at the right of diaphragm 110. When brake pipe pressure is applied to chamber 148, it is first effective on diaphragm 111 about the pheriphery of the diaphragm 111, and upon movement of a diaphragm 111 to the left, a larger central portion of the abutment 149 is exposed to actuate the diaphragm 111 with a snap action to quickly complete its movement to the left. The abutment 149 has a stem 150 extending to the right of the abutment 149 having a right hand end 151 adapted for engagement with a jaw 152 secured to the check valve 120 so as to open the check valve 120 upon movement of the diaphragm 111 to the left. A stem 153 extends to the left of abutment 149 having a coaxial bore 154 for receiving a loosely fitted push rod 155 for actuating the graduating check valve 132, the push rod 155 extending through an axial bore 156 in an abutment 157 adjoining the diaphragm 112. The push rod 155 is provided with a snap ring 158 for engagement with the left hand end of a stem extension of abutment 157 to actuate the graduating valve 132.

A cap 160 is provided for selectively covering the passage 161 in the exhaust line of the brake cylinder 21, or to be positioned so as to permit exhaust of fluid through passage 161 to atmosphere in case it is desired to have the valve device 10 operate as a direct release valve.

With reference to FIGS. 2 and 4, a two-pressure safety valve 101 is provided to ensure that an over reduction by the service portion 12 will not result in a higher pressure brake application then the normal service pressure and that an emergency application is limited to 85 psi. The valve device 101 has an input port 170 connected to brake cylinder pressure over passage 26 (see FIG. 1B), a port 171 connected to brake pipe pressure over passage 17 (see FIG. 1B) and an exhaust port EX to atmosphere. A housing 172 of two-pressure valve device 101 has a stepped bore 173 containing a piston 174. The piston 174 is normally raised upwardly against a shoulder 175 of the housing 172 by brake pipe pressure that is continuously applied to the inlet port 171 and to a chamber 176 inside of the piston 174. The piston 174 is held in this position against the preload of a spring 177 in chamber 178 above the piston 174. A poppet valve 180 is normally biased to a closed position by a service spring 181 having its force transmitted to valve 180 through a push rod 182.

OPERATION OF FIGS. 3, 4, 1B, AND 1C

Charging

During charging of the equipment from the brake pipe 16, brake pipe pressure conditions the ABDW valve as has been described relative to the preferred form of the invention, and brake pipe pressure is applied to inlet port 125 of the graduatng valve device 100 of FIG. 3. Also the emergency reservoir 23 is charged at the same time, and the emergency reservoir pressure is applied to port 130 of the graduating valve device 100 of FIG. 3. The brake pipe pressure builds up through passages 124 and 123 to charge chambers 126 and 127 at the right hand side of diaphragms 110 and 112 respectively. Emergency reservoir pressure is applied to input port 130 and over passage 129 to chamber 128 on the left hand side of abutment 157. The release insuring valve abutment 157 moves to the left because of both a differential of brake pipe over emergency reservoir pressure and the area differential of its brake pipe side of the diaphragm 112 as compared to the emergency reservoir side. In its leftward position, the hollow stem 156 of the release insuring device contacts the thrust collar 158 on the otherwise floating push rod 155 and forces push rod 155 to the left. This forces the release graduating check valve 132 off of its seat, and as long as the brake pipe pressure remains higher than 90% of the emergency reservoir pressure, the release insuring valve remains in its left hand operated position and the graduating check valve 132 remains off of its seat independent of any action of the rest of the graduating valve device 100.

While the equipment is charging, brake pipe pressure is applied in the chamber 126 on the right hand side of the release graduating pilot slide valve abutment 141 and in chamber 121 on the left hand side of the control reservoir charging check valve 120. The check valve 120 would prevent charging of the control reservoir 100c except for the fact that when the abutment 141 moves to the left, the slide valve 140 applies brake pipe pressure over passage 147 to the chamber 148 on the right hand side of the abutment 149. When pressure in chamber 148 builds up to approximately 10 psi, the piston 149 moves to the left, exposing the much larger area of chamber 148 and causing a rapid increase in the force exerted to the left on the graduating piston stem 155. This causes the stem 155 to move to the left with a snap action and pull the control reservoir charging check valve 120 off of its seat. This action permits the brake pipe fluid to flow to the control reservoir 100C, and to balance the brake pipe pressure on the graduating pilot valve diaphragm 110 when sufficient air has flowed through a choke 200 in passage 117 to charge the control reservoir to within 10% of the brake pipe pressure as determined by the differential area of the graduating pilot valve stems on the opposite sides of abutment 141. The graduating pilot valve 140 now moves to the right, venting fluid from the release graduating valve chamber 148 and returning the abutment 149 to its right hand position to terminate the further flow of fluid from the brake pipe into the graduated release reservoir 100C.

Because of the termination of charging of the control reservoir 100c at 90% of brake pipe pressure, the graduating pilot valve 140 is in a nearly force balanced condition. The release insuring abutment 157 is contacting the thrust collar 158 on stem 155 to hold the graduating check valve 132 off of its seat 210, thus guaranteeing tht the release of brake cylinder pressure will not be impeded by the release graduating valve 132. The control reservoir charging check valve 120 is being held to its seat at this time both by a light spring force of spring 211, and by a slight pressure differential of the brake pipe pressure above conrol reservoir pressure. The release graduating abutment 149 is on its right hand stop 212 exerting no pressure on the push rod 155, and is held in this state by the release graduating valve spring 213, with atmospheric pressure on both sides of the diaphragm 111.

Brake Application

When brakes are applied, brake pipe pressure is reduced, causing no motion of the release graduating Pilot Slide Valve abutment 141 as it is already in its right hand position, and is simply forced that way all the more as by the increased differential of control reservoir pressure above brake pipe pressure. As soon as brake pipe pressure drops to a value equal to or slightly less than the control reservoir pressure, however, the control reservoir pressure forces the control reservoir charging check valve 120 off of its seat, and equalizes into the brake pipe passage 122. In this manner, reduction of brake pipe pressure reduced control reservoir pressure in step with itself until the maximum brake application, or brake pipe reduction, has been completed for the cycle of braking under consideration.

The reduction of brake pipe pressure reduces the pressure on the right hand side of the release insuring abutment 157, while the unchanged emergency reservoir pressure on the left hand side of the abutment 157 causes the differential of emergency reservoir pressure over brake pipe pressure to move the release insuring device to the right so as to permit the graduating check valve 132 to be actuated by spring 230 to move the graduating check valve 132 to its seat 210 and prevent the release of air from the brake cylinder should such a release be attempted.

Graduated Release

During a graduated release of the brakes of the vehicle, brake pipe pressure is partially restored at a rate which may be slow or fast dependent upon many conditions. Thus, the graduated release control valve must graduate off the brakes in proportion to brake pipe pressure and independent of the rate of brake pipe pressure rise.

As a preliminary stage in the graduating release of pressure from the brake cylinder 21 (see FIG. 1B), brake pipe pressure is increasing and establishing a pressure differential over the pressure of control reservoir 100c (see FIG. 3). When this differential amounts to approximately 10%, as determined by the release graduating pilot valve 140, the release graduating pilot valve stem 140 moves to the left. Until such differential is established, no motion of the valve stem 140 occurs, and both the release graduating valve 132 and the release insuring device 149 remain in their right hand positions and the graduating check valve 132 remains on its seat.

During this preliminary phase, the ABDW control valve service portion 12 (see FIG. 1B and 1C) moves to the full release position, and aids in the restoration of brake pipe pressure by accelerated service release operation. Thus, brake cylinder pilot pressure from the ABDW control valve is ported to the retainer pipe (not shown) and to input port 134 of the graduating valve device 100 over passage 29, and over passage 133 to the chamber 131 back of the release insuring check valve 132. This pressure cannot be exhausted to atmosphere, however, because the graduating check valve 132 is held on its seat because of the abutment 149 being in a right hand position.

Further restoration of brake pipe pressure during the release, however, establishes a differential of brake pipe pressure over control reservoir pressure of more than 10%. When this occurs, the graduating pilot valve 140 moves to the left, charging chamber 148 to the right of abutment 149 and causing the abutment 149 to move to the left and actuate stem 155 to a position opening the graduating check valve 132. Upon the opening of check valve 132, fluid from the brake cylinder is exhausted through passage 133, chamber 131, and passage 136 to atmosphere. The rate of release of fluid from the brake cylinder as has been described is governed by a choke 231 in the passage 133, while simultaneously the control reservoir 100c is being recharged through choke 200 over passage 117 due to the abutment 149 having pulled the check valve 120 to an open position by its left hand movement to permit charging of the control reservoir 100c from the brake pipe passage 122. This charging of the control reservoir 100c destroys the differential of brake pipe pressure over control reservoir pressure as sensed by the graduating pilot valve 140, thus moving the graduating pilot valve 140 once more to its right hand stop, venting chamber 148 to the right of abutment 149 and returning the abutment 149 to its right hand stop. This terminates both discharge of brake cylinder control pipe volume through the graduating release check valve 132 to atmosphere and the charging of the control reservoir 100c through check valve 120 from the brake pipe.

Further increase in brake pipe pressure, of course, brings about a further cycle to reduce further brake cylinder pressure and repeated cycles are generated as long as there are increases in brake pipe pressure. The graduating of the release of fluid from the brake cylinder is controlled at a rate determined by the choke 231 in the passage 133 for exhausting the brake cylinder, and the choke 200 in the passage 117 for governing the rate of charging of the control reservoir 100c. Thus the rate of graduated brake release is governed by these chokes, rather than being governed by the rate of increase in brake pipe pressure which may be variable, particularly relative to the position of the vehicle in a train.

Release Insuring

The graduating release of the brake pressure of the brake cylinder 21 as described above continues until the brake pipe pressure rises to within 10% of the emergency reservoir pressure, at which time the release insuring control apparatus becomes effective as has been heretofore described to actuate abutment 157 to the left to act on the snap ring 158 to push the graduating valve 132 to on open position and permit direct release of the fluid pressure remaining in the brake cylinder.

Two Pressure Safety Valve

With reference to FIG. 4, the two-pressure safety valve 101 always has the brake cylinder control pipe pressure, as developed in the ABDW valve, applied at the input port 170, which is connected to a passage 240 containing a choke 241 and to the lower face 242 of the safety valve poppet 180. At the same time brake pipe pressure is applied to port 171 and through passage 243 to chamber 176 beneath the emergency piston 174, holding this piston up against the preload of the emergency high pressure spring 177 in chamber 178. Only the service pressure spring 181 bears, through the push rod 182, on the safety valve poppet 180. The force of this spring, as adjusted by shimming, is such as to permit the poppet 180 to lift from its seat at 65 psi brake cylinder pressure.

In the event of a brake pipe pressure over-reduction, resulting in the attempt on the part of the ABDW control valve to supply a higher brake cylinder control pipe pressure than the normal service pressure, the force on the face 242 of the poppet valve 180 exceeds that of the spring 181, permitting the poppet valve 180 to move upwardly, thus venting brake cylinder control pipe pressure to atmosphere through chokes 241 and 246. The sizes of these chokes are so chosen that when the poppet valve 180 lifts from its seat, sufficient back pressure builds up between choke 146 and the port 170 to urge the poppet 180 back to its seat, thus off setting the tendency of the valve to rise due to dynamic effects of the fluid on its face 242. Changes in effective area of check valve 180 caused by its opening stablizes the valve 180. Choke 241 further aids this stabilization and helps to limit the regulative control pipe exhaust to a value low enough that excessive reduction of this pressure below 65 psi is avoided.

Emergency Application

In the event of an emergency brake application, brake pipe pressure supplied to port 171 of the two pressure valve 101 is reduced to a value so low that the pressure in chamber 176 acting on the bottom of the piston 174 will be insufficient to compress the heavier spring 177 in chamber 178, thus this spring will move the piston 174 downwardly and further compress the safety valve spring 181 in chamber 176, resulting in an increase in the operating pressure of the safety valve from 65 psi to 85 psi. The loading of both springs 177 and 181 in chambers 178 and 176 respectively is controlled by shims during valve assembly, and the valve seat of the poppet 180, which is critical to proper operation of the valve is provided with both a hard seat 244 and a soft seat 245. The metal seats are lapped, and the soft seat is provided to reduce leakage to zero, thus preventing any possibility of loss of brakes through a defective safety valve seat.

Having thus described pneumatically operated graduating release valve devices for railway vehicles as both preferred form and a modified form of the present invention, it is to be understood that various modifications and alterations may be made to the specific embodiments illustrated, without departing from the spirit or scope of the invention.

What is claimed is:

1. A brake control system for passenger railway vehicle brakes comprising, a control valve device of the type limited to direct release of a brake application as used on a freight rail vehicle having service, emergency, and continuous quick service portions secured to a pipe bracket, the pipe bracket being connected to a brake pipe and to emergency and auxiliary reservoir means and brake control means having a brake cylinder;

(a) a graduating release valve portion operably connected to the control valve device and to the brake pipe for providing graduated release of the brakes, the graduating release valve portion comprising;
 (1) graduating check valve means operably connected to a brake cylinder exhaust passage of the control valve device for further controlling exhaust of fluid from the brake cylinder,
 (2) graduating valve control means having pressure chambers for selectively actuating a graduating valve stem axially to control the graduating check valve means,
(b) brake release means govern jointly by the control valve device and the graduated release valve portion, and
(c) the graduating release portion comprises release insuring valve means for venting the brake cylinder to atmosphere when brake pressure is reduced to a predetermined low value, irrespective of an attempt by the graduating check valve means to prevent direct release of the brakes.

2. A brake control system for passenger railway vehicle brakes according to claim 1 wherein the release insuring valve means includes a release insuring valve controlled by a diaphragm for sensing when the brakes are close to restoration to full release positions following a brake application.

3. A brake control system for passenger railway vehicle brakes according to claim 2 wherein the release insuring valve means compares brake cylinder pressure on one side of its diaphragm with graduating spring pressure on the other side of its diaphragm.

4. A brake control system for passenger railway vehicle brakes according to claim 3 wherein the release insuring valve means has slide valve means including a stem having an axial bore for selectively venting the brake cylinder when rendered effective, irrespective of operation of the graduating valve control means.

5. A brake control system for passenger railway vehicle brakes according to claim 2 wherein the release insuring valve means compares brake pipe and emergency fluid pressures on opposite sides of a release insuring diaphragm and actuates a valve stem axially to hold the graduating check valve open to insure full release of fluid pressure in the brake cylinder.

6. A brake control system for passenger railway vehicle brakes according to claim 5 wherein a pressure differential is obtained for axial actuation of the valve stem even though brake pipe and emergency pressures are substantially the same because of a difference in diameter of valve stems on opposite sides of the release insuring diaphragm.

7. A brake control system for passenger railway vehicle brakes according to claim 1 wherein the graduating valve control means has differential pressure control means operable to sense alternately relative high and low rates of exhaust of brake cylinder pressures as compared to increases in brake pipe pressure for repeatedly graduating release of brake cylinder fluid by cyclical operation of the graduating check valve means.

8. A brake control system for passenger railway vehicle brakes according to claim 7 wherein the graduating check valve means comprises the use of control pressure on opposite sides of at least two diaphragms.

9. A brake control sysem for passenger railway vehicle brakes according to claim 8 wherein the two diaphragms are subject to pressures from different sources respectively for generating differential forces for governing operations of the graduating valve means.

10. A brake control system for passenger railway vehicle brakes according to claim 9 wherein the diaphragms are axially connected by a common valve stem for axial operation to selectively control the graduating check valve means.

11. A brake control system for passenger railway vehicle brakes according to claim 10 wherein a first of the diaphragms compares brake pipe pressure with a reference pressure.

12. A brake control system for passenger railway vehicle brakes according to claim 11 wherein a second of the diaphragms compares brake cylinder exhaust passage pressure with a resultant force on the first diaphragm.

13. A brake control system for passenger railway vehicle brakes according to claim 8 wherein a first of the diaphragms compares brake pipe pressure with a reference pressure to selectively apply brake pipe pressure to one side of the second diaphragm for selectively opening the graduating check valve means.

14. A brake control system for passenger railway vehicle brakes according to claim 13 wherein the second diaphragm has a multiple compartment chamber on one side thereof for actuation of the second diaphragm with a snap action to open the graduating check valve means.

15. A brake control system for passenger railway vehicle brakes according to claim 1 wherein the graduating release valve portion comprises a control reservoir and charging check valve means for charging the control reservoir from the brake pipe.

16. A brake control system for passenger railway vehicle brakes according to claim 15 wherein relief valve means is provided for reducing pressure in the control reservoir substantially to brake pipe pressure when a substantial differential is obtained between control reservoir pressure and brake pipe pressure.

17. A brake control system for passenger railway vehicle brakes according to claim 16 wherein the relief valve means comprises a diaphragm valve for comparing control reservoir pressure with brake pipe pressure.

18. A brake control system for passenger railway vehicle brakes according to claim 15 wherein the charging check valve means comprises interlocking connecting means for permitting the check valve means to be selectively opened upon axial operation of a stem of the graduating valve means.

19. A brake control system for passenger railway vehicle brakes according to claim 18 wherein the charging check valve means is open by operation of graduating valve means to a position to open the graduating check valve.

20. A brake control system for passenger railway vehicle brakes according to claim 19 wherein a choke is included in a passage connecting the control reservoir charging check valve means to the control reservoir.

21. A brake control system for passenger railway vehicle brakes according to claim 20 wherein a choke is provided in a passage connecting brake cylinder exhaust fluid pressure to a chamber adjoining the graduating release check valve means.

22. A brake control system for passenger railway vehicle brakes according to claim 1 wherein two-pressure safety valve means is provided for selectively limiting pressures for service and emergency application in case of over-reduction in control brake pipe pressure of a train in which the vehicle may be operating.

23. A brake control system for passenger railway vehicle brakes according to claim 22 wherein the two-pressure safety valve means comprises a poppet valve having a service spring normally biasing the safety valve means to a closed position to prevent the venting of brake cylinder pressure on a face of the poppet valve to atmosphere up to normal service brake pressure.

24. A brake control system for passenger railway vehicle brakes according to claim 23 wherein the poppet valve is tapered, and has an O-ring therein so that changes in the effective area of the poppet valve seat caused by its opening stablizes the poppet valve.

25. A brake control system for passenger railway vehicle brakes according to claim 24 wherein the chokes are used both in input and output passages of the poppet valve to stablize regulation of the brake cylinder pressure to a desired value.

26. A brake control system for passenger railway vehicle brakes according to claim 25 wherein the poppet valve is normally held closed in part by a service spring and in part by brake pipe pressure inside of a piston that is biased by emergency spring means, wherein reduction of brake pipe pressure for an emergency brake application allows the emergency spring pressure to urge the poppet valve closed with a force to permit brake cylinder pressure to build up to a desired emergency pressure before opening the poppet value.

* * * * *